(12) United States Patent
Nowatzyk et al.

(10) Patent No.: US 11,868,644 B1
(45) Date of Patent: Jan. 9, 2024

(54) TECHINQUES FOR TRACKING FREQUENTLY ACCESSED MEMORY

(71) Applicant: VMware, Inc., Palo Alto, CA (US)

(72) Inventors: Andreas Georg Nowatzyk, San Jose, CA (US); Isam Wadih Akkawi, Santa Clara, CA (US); Pratap Subrahmanyam, Saratoga, CA (US); Adarsh Seethanadi Nayak, Troy, NY (US); Nishchay Dua, Pleasanton, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/870,616

(22) Filed: Jul. 21, 2022

(51) Int. Cl.
*G06F 3/06* (2006.01)
*G06F 12/02* (2006.01)

(52) U.S. Cl.
CPC .......... *G06F 3/0653* (2013.01); *G06F 3/0611* (2013.01); *G06F 3/0647* (2013.01); *G06F 3/0683* (2013.01); *G06F 12/0292* (2013.01); *G06F 2212/1024* (2013.01)

(58) Field of Classification Search
CPC .... G06F 3/0653; G06F 3/0611; G06F 3/0647; G06F 3/0683; G06F 12/0292; G06F 2212/1024; G06F 3/06
See application file for complete search history.

(56) References Cited

U.S. PATENT DOCUMENTS

| | | | | |
|---|---|---|---|---|
| 2013/0282983 | A1* | 10/2013 | Mills | G06F 3/0649 711/122 |
| 2014/0281260 | A1* | 9/2014 | Peterson | G06F 3/0679 711/135 |
| 2015/0278013 | A1* | 10/2015 | Rao | G11C 11/5678 714/6.2 |
| 2021/0406183 | A1* | 12/2021 | Mashimo | G06F 12/0862 |

* cited by examiner

*Primary Examiner* — Khoa D Doan

(57) ABSTRACT

In one set of embodiments, a hardware module of a computer system can receive a stream of addresses corresponding to memory units being accessed by a central processing unit (CPU) of the computer system. The hardware module can further generate a frequency estimate for each address in the stream of addresses, the frequency estimate being indicative of a number of times a memory unit identified by the address has been accessed by the CPU, and can determine, based on the generated frequency estimates, a set of n most frequently accessed memory units.

21 Claims, 11 Drawing Sheets

TECHINQUES FOR TRACKING FREQUENTLY ACCESSED MEMORY

BACKGROUND

Unless otherwise indicated, the subject matter described in this section is not prior art to the claims of the present application and is not admitted as being prior art by inclusion in this section.

Modern computer systems use a tiered memory architecture that comprises a hierarchy of different memory technologies with varying cost and performance characteristics. For example, the highest tier of this hierarchy typically consists of central processing unit (CPU) caches, which are expensive because of their adjacency to the system's processing cores but provide very fast access times. The next highest tier typically consists of dynamic random-access memory (DRAM) modules that are directly coupled with the system's CPU sockets via a memory bus. The subsequent tiers of the hierarchy may include slower but cheaper (or at least more cost efficient) memory types such as byte-addressable persistent memory, remote memory, and so on.

In many cases, one or more portions of an application's memory address space will be mapped to the lowest tier in the hierarchy because that memory is most abundant. As long as the memory pages in these portions are accessed infrequently, the loss in application performance arising out of slow memory access will be small and outweighed by the cost savings achieved by using that cheaper memory. However, if some memory pages placed in the lowest tier are frequently accessed, the resulting performance loss may be unacceptably high.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Example Computer System and Solution Overview

Embodiments of the present disclosure are directed to techniques for tracking the most frequently accessed memory units, such as memory pages, in a computer system. In cases where the computer system employs a tiered memory architecture with a hierarchy of tiers, this information can be leveraged to migrate frequently accessed memory units from lower (i.e., slower) to higher (i.e., faster) tiers of the hierarchy, thereby improving the performance of the consumer(s) of those memory units.

Figure 1:
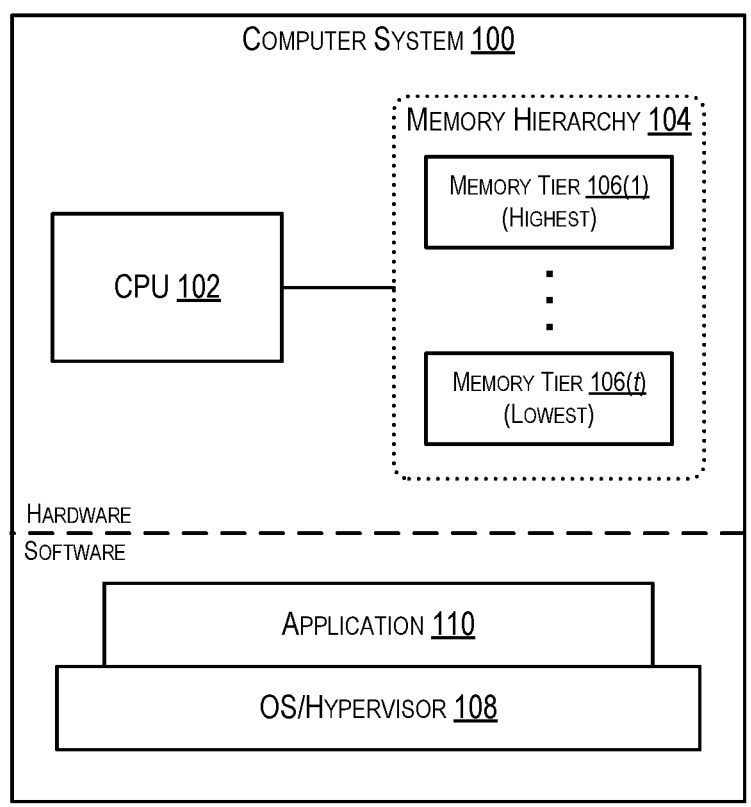
FIG. 1 depicts an example computer system.

FIG. 1 is a simplified block diagram illustrating an example computer system 100 in which the techniques of the present disclosure may be implemented. As shown, computer system 100 includes in hardware a CPU 102 that is coupled with a memory hierarchy 104. Memory hierarchy 104 is a logical collection of memory tiers 106(1)-(t) that are ordered from highest (106(1)) to lowest (106(t)). Each memory tier 106 represents a different type of physical memory present in computer system 100, with higher memory tiers consisting of faster but more expensive (and thus scarcer) memory and lower memory tiers consisting of slower but cheaper (and thus more abundant) memory. For example, highest memory tier 106(1) may comprise one or more caches of CPU 102, which offer very fast memory access times (e.g., on the order of nanoseconds) but are typically limited in size to several tens of megabytes. In contrast, lowest memory tier 106(t) may comprise persistent memory that is connected to CPU 102 via a peripheral interface such as Compute Express Link (CXL), which offers much slower memory access times (e.g., on the order of hundreds of nanoseconds) but can feasibly reach capacities of several terabytes or more.

Further, computer system 100 includes in software an operating system (OS) or hypervisor 108 and an application 110. Application 110 may be, e.g., a virtual machine, a container, or any other type of software workload that runs on CPU 102 and makes use of the memory in memory hierarchy 104.

As mentioned in the Background section, in a tiered memory system like computer system 100, OS/hypervisor 108 will typically map at least a portion of the memory address space of application 110 to lowest memory tier 106(t) of logical memory hierarchy 104 because this conserves the faster/more expensive memory in higher memory tiers and thus avoids the high costs needed to provision large amounts of such expensive memory. This approach generally works well if the memory units of application 110 that are placed in lowest memory tier 106(t) are accessed infrequently (i.e., are "cold"); however, if one or more of those memory units are in fact accessed frequently (i.e., are "hot"), the performance of application 110 can noticeably suffer due to the slow access time/high latency of the memory in the lowest tier.

Figure 2:
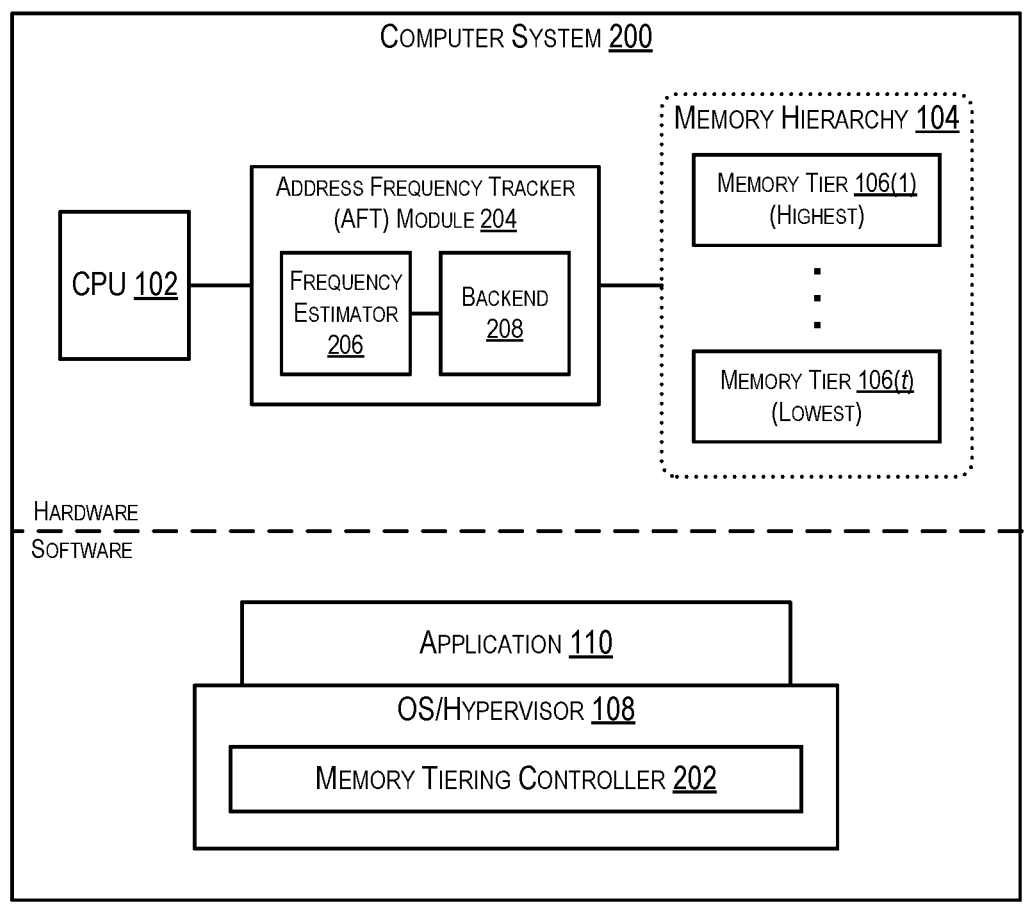
FIG. 2 depicts an enhanced version of the computer system of FIG. 1 according to certain embodiments.

To address the foregoing and other similar issues, FIG. 2 depicts an enhanced version of computer system 100 of FIG. 1 (i.e., computer system 200) that includes a memory tiering controller 202 within OS/hypervisor 108 and a hardware-based address frequency tracker (AFT) module 204 comprising a frequency estimator 206 and a backend 208. Although AFT module 204 is shown as being situated between CPU 102 and memory hierarchy 104 for simplicity, in practice AFT module 204 may be implemented as part of a memory control plane for one or more of the lower memory tiers of hierarchy 104. For example, in the scenario where lowest memory tier 106(*t*) comprises memory residing on a CXL-attached device, AFT module 204 may be implemented as a logic block within the CXL-attached device's memory controller or as a separate chip (e.g., a field-programmable gate array (FGPA) or application-specific integrated circuit (ASIC)) communicatively coupled with that memory controller.

At a high level, AFT module 204 can receive a stream of addresses corresponding to memory units that CPU 102 accesses (e.g., reads via memory load operations or writes via memory store operations) as part of executing application 110 and can pass the addresses to frequency estimator 206. In response, frequency estimator 206 can generate for each address a frequency estimate indicative of the number of times that address (and thus, the memory unit it addresses) has been accessed and can pass this frequency estimate to backend 208. Finally, backend 208 can synthesize actionable information based on the frequency estimates generated by frequency estimator 206, which memory tiering controller 202 (or some other software or hardware component) can leverage for various purposes. For example, in one set of embodiments backend 208 can synthesize a list of the n most frequently accessed memory units and memory tiering controller 202 can initiate migration of those n memory units from a lower to higher memory tier of memory hierarchy 104. In this way, AFT module 204 and memory tiering controller 202 can avoid scenarios in which hot memory units are kept in a low (i.e., slow) memory tier and thus significantly improve the performance of application 110.

The remaining sections of this disclosure provide additional details for implementing frequency estimator 206 and backend 208 of AFT module 204 according to various embodiments. Generally speaking, these embodiments (1) enable AFT module 204 to process a very high rate of addresses without throttling, (2) support a programmable time window over which frequency estimates are determined/weighted, and (3) allow for the efficient implementation of AFT module 204 in hardware (e.g., without requiring an excessive amount of chip area or power). (1) is important because the address stream will ultimately be passed on beyond AFT module 204 in order to execute memory operations and thus any throttling of the address stream at module 204 will negatively affect system performance. (2) is important because the memory footprint of application 110, as well as the rates at which various portions of the application's memory address space are used, will change over time; a memory page that was cold for several minutes may suddenly become hot and vice versa. Accordingly, the time scales over which the application's memory access frequencies are tracked and evaluated should be adjustable. And (3) is important because an efficient hardware implementation allows AFT module 204 to be economically integrated into, or built as a separate chip that interfaces with, a hardware memory controller.

It should be appreciated that FIGS. 1 and 2 are illustrative and not intended to limit embodiments of the present disclosure. For example, although these figures depict a particular arrangement of components within computer system 100/200, other arrangements are possible (e.g., the functionality attributed to a particular component may be split into multiple components, components may be combined, etc.). In addition, computer system 100/200 may include other components or subcomponents that are not specifically described. One of ordinary skill in the art will recognize other variations, modifications, and alternatives.

2. Frequency Estimator Implementation 2.1 Hardware Architecture and Workflow

Figure 3:
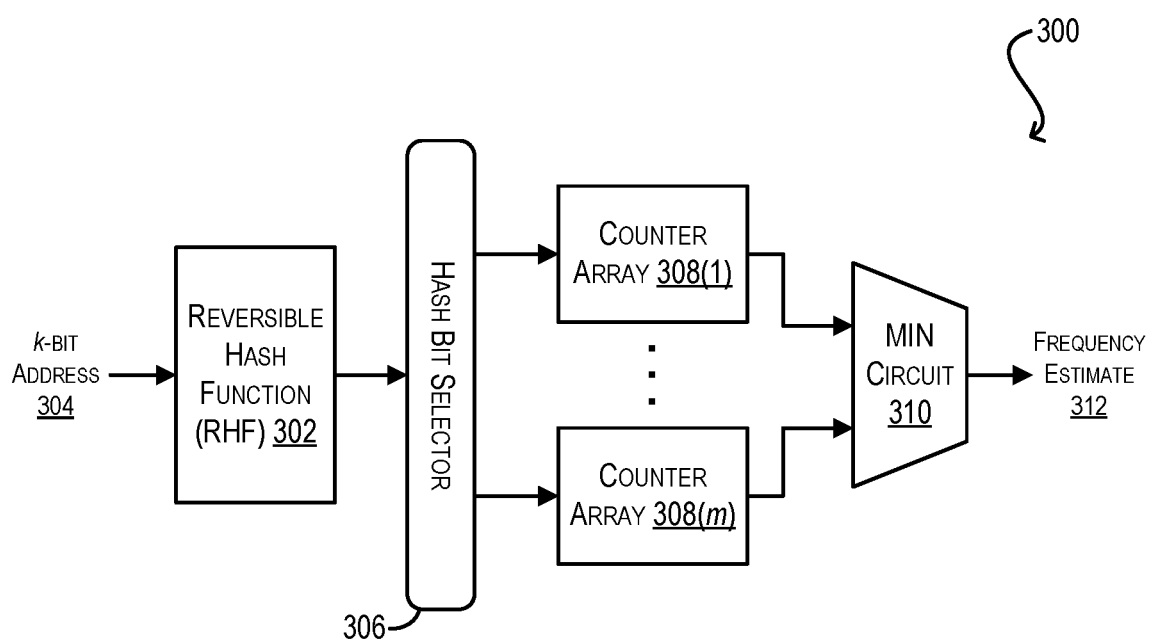
FIG. 3 depicts an example hardware architecture for a frequency estimator according to certain embodiments.
Figure 4:
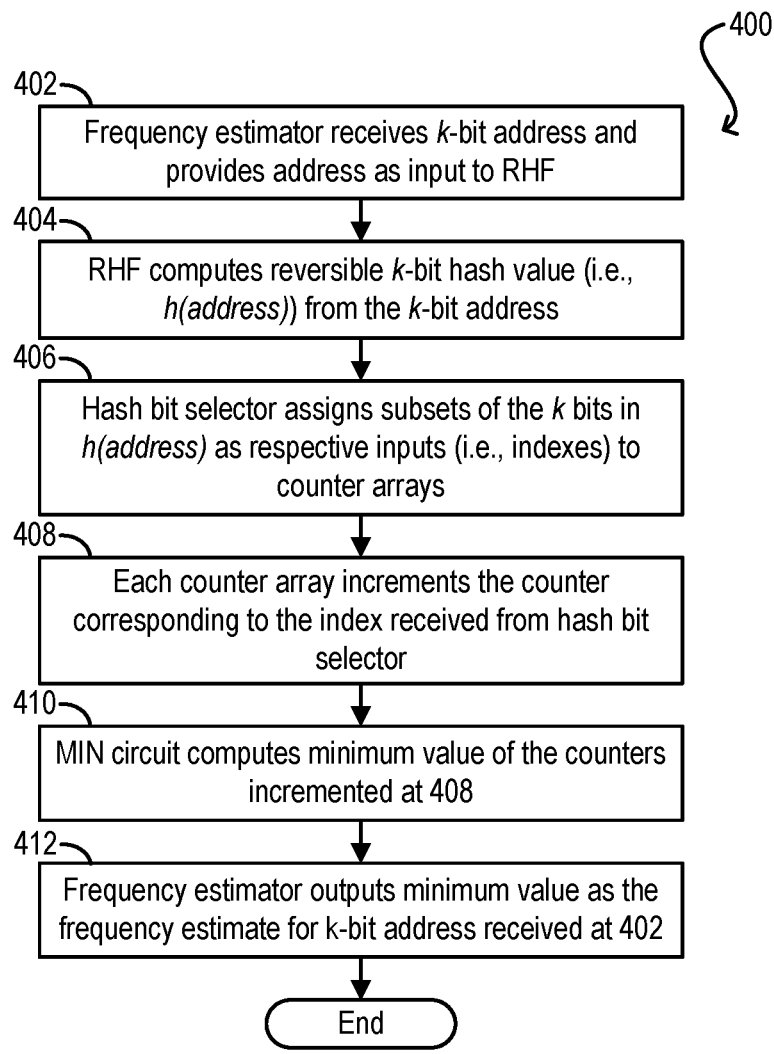
FIG. 4 depicts a workflow that may be executed by the frequency estimator of FIG. 3 according to certain embodiments.

FIG. 3 depicts an example hardware architecture 300 for frequency estimator 206 of FIG. 2 and FIG. 4 depicts a workflow 400 that may be executed by frequency estimator 206 using this architecture for generating frequency estimates according to certain embodiments. As shown in FIG. 3, frequency estimator architecture 300 includes four high-level components or component groups: a reversible hash function (RHF) 302 that takes as input a k-bit address 304 from the stream of addresses received at AFT module 204, a hash bit selector 306, a set of counter arrays 308(1)-(m), and a MIN circuit 310 that outputs a frequency estimate 312 for address 304. In general terms, this frequency estimate is an estimate of the number of times address 304 has been accessed by CPU 102 and thus received (or in other words "seen") by AFT module 204. As explained in subsection 2.3 below, in certain embodiments frequency estimate 312 can be weighted such that it most heavily reflects the access frequency of address 304 within some recent time window.

Although not shown in FIG. 3, in some embodiments frequency estimator 206 may output address 304 (or a hash of this address computed via RHF 302) along with frequency estimate 312, rather than outputting frequency estimate 312 alone. This can facilitate certain implementations of backend 208. Further, in some embodiments the address stream ingested by frequency estimator 206 may be subject to an initial filtering logic. This filtering logic can achieve a number of different goals, such as narrowing the memory address range for which frequency estimates are generated or filtering the addresses by type of memory operation (e.g., load or store).

Turning now to workflow 400 of FIG. 4, starting with step 402, frequency estimator 206 can receive a k-bit address 304 and can provide address 304 as input to RHF 302. As mentioned previously, address 304 is part of an address stream generated by CPU 102 and identifies a memory unit (e.g., memory page) accessed by the CPU via a memory operation during the course of executing some program code such as application 110.

At step 404, RHF 302 can compute a reversible k-bit hash value based on address 304, denoted as h(address). This k-bit hash value, which is effectively a random permutation of the original k bits in address 304, is reversible because address 304 can be reconstructed from it; in other words, for each possible k-bit address, there is exactly one unique hash value computed by RHF 302. Thus, RHF 302 is similar to a cryptographic encryption function that receives a plain-text input (e.g., address 304) and computes a cipher-text (e.g., h(address)) that does not reveal anything regarding the plain-text but can be decrypted using an appropriate decryption function to recover that plain-text.

An important reason for performing the hashing at step 404 via RHF 302 is to remove spatial locality in the address stream received by AFT module 204. A hardware implementation of RHF 302 that achieves this in an efficient manner is discussed in subsection 2.2 below.

At step 406, hash bit selector 306 can receive h(address) from RHF 302 and, using fixed bit assignment logic, assign subsets of the k bits in h(address) as respective inputs (i.e., indexes) to counter arrays 308(1)-(m). For example, assume h(address) comprises 48 bits and each counter array accepts a 12-bit index. In this scenario, hash bit selector 306 may assign bits 0-11 of h(address) as the index for counter array 308(1), bits 12-23 of h(address) as the index for counter array 308(2), and so on.

Each counter array 308 is a static memory block that maintains an array of counters (one per unique index) and increments a given counter upon receiving (or in other words, being "indexed by") that counter's corresponding index. Thus, at step 408, each counter array 308 can increment the counter corresponding to the index received from hash bit selector 306. In this way, the counter array can track via that counter the number of times address 304 (which is uniquely mapped to h(address)) has been seen by AFT module 204.

Significantly, in various embodiments the bit length of the index accepted by each counter array 308 (denoted herein as c) is less than the bit length of address 304 or h(address) (i.e., k). This is because k is often large (e.g., 32 bits or more), and thus implementing a counter array that accepts a k-bit index—which means the counter array maintains 2 k counters—would be prohibitively expensive. Instead m smaller counter arrays, each accepting a c-bit index (and thus maintaining 2' counters), are used. This advantageously reduces the total number of counters implemented within frequency estimator 206 from $2^k$ to $2^c \cdot m$.

One consequence of this approach is that multiple different addresses may index the same counter in a given counter array, leading to overestimation of the access frequency for each of those addresses. Such a scenario will occur if the subsets of bits selected from the hashes of those addresses for indexing the counter array happen to be the same (i.e., "collide"). To address this, at the time of designing frequency estimator 206, multiple trial versions of RHF 302 and/or hash bit selector 306 that generate different bit outputs can be created and each trial version can be evaluated against all possible (or a significant number of) k-bit input addresses in order to determine the number of collisions that occur when using the resulting hash values to index counter arrays 308(1)-(m). Based on this evaluation, the "best" trial version (or in other words, the version that minimizes the number of collisions) can be chosen for use in frequency estimator 206.

Once the appropriate counters of counter arrays 308(1)-(m) have been incremented in accordance with the indexes received from hash bit selector 306, the incremented counter values can be provided as input to MIN circuit 310. In response MIN circuit 310, which may be implemented via a min-combining tree or some other functionally similar logic, can compute and output the minimum of those counter values (step 410). As noted above, with multiple small counter arrays, it is possible for several addresses to index the same counter in a given counter array, leading to frequency overestimation. However, it is unlikely that those same addresses will also collide on other counter arrays, particularly if RHF 302 and/or hash bit selector 306 have been designed to minimize collisions. Thus, by taking the minimum of all of the incremented counter values for address 304 across counter arrays 308(1)-(m), a relatively good estimate of the true frequency of that address can be obtained.

Finally, at step 412, frequency estimator 206 can output the minimum counter value as the frequency estimate for address 304 and workflow 400 can end. In some embodiments, frequency estimator 206 may output the frequency estimate together with address 304 or h(address) as a pair for use by, e.g., backend 208.

2.2 RHF Implementation

Figure 5:
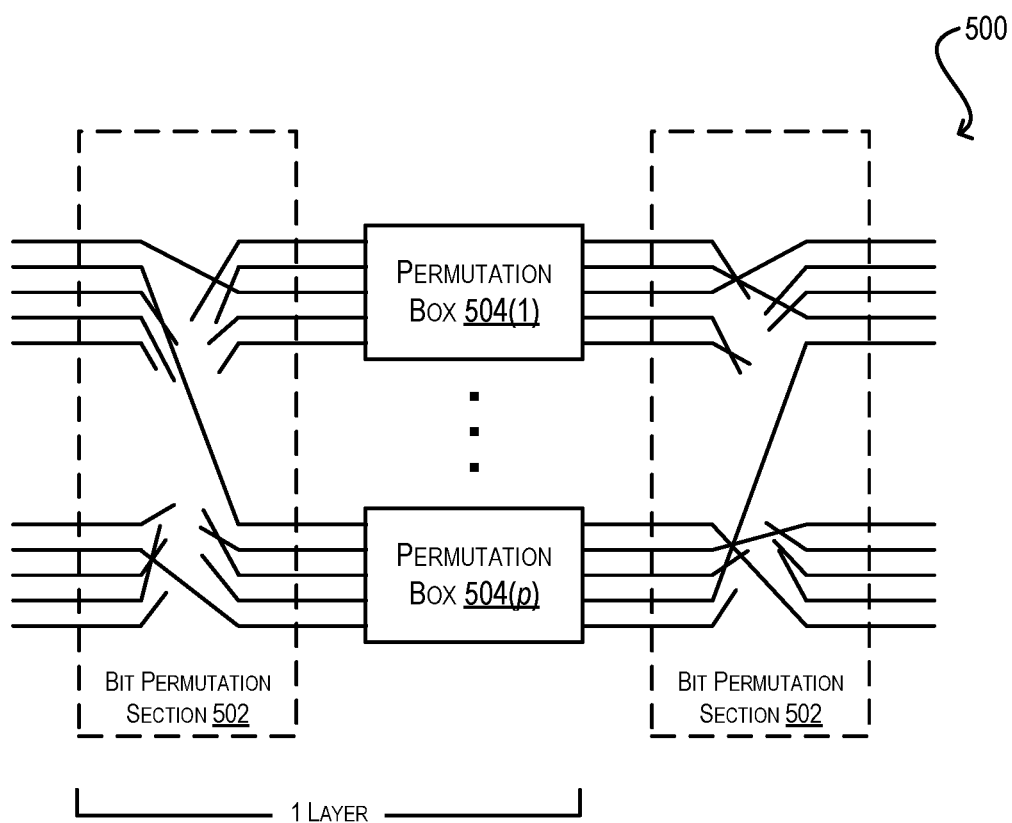
FIG. 5 depicts an example hardware architecture for a reversible hash function according to certain embodiments.

FIG. 5 depicts an example hardware architecture 500 for RHF 302 of FIG. 3 according to certain embodiments. RHF architecture 500 is designed to be implemented efficiently in FPGA logic.

As shown in FIG. 5, RHF architecture 500 is composed of multiple layers, each layer consisting of a bit permutation section 502 and a set of permutation boxes 504(1)-(p). Bit permutation section 502 receives the bits of an address (either from the input of the RHF or from a previous layer) via a set of input wires and statically scrambles those address bits before passing them on to permutation boxes 504(1)-(p) via a set of output wires connected to the input wires. Each permutation box 504 takes as input a set of 5 or 6 bits from bit permutation section 502 and performs a further scrambling of those 5 or 6 bits in a fixed manner, resulting in a unique 5-bit or 6-bit output. The outputs of permutation boxes 504(1)-(p) are then passed on to the input wires of the bit permutation section of the next layer and this process is repeated for all subsequent layers. At the last layer, the outputs of permutation boxes 504(1)-(p) are output by the RHF as the hash value for the original input address.

In one set of embodiments, the bit permutation section of each layer can be created by employing a pseudo-random number (PRN) generator to select two input-to-output wires of the section, swapping their connections, and repeating these steps. Upon repeating this process thousands of times, a random permutation of the original input bits can be produced. In some embodiments, this process can alternate between odd and even permutations for successive layers.

Similarly, each permutation box can be created by using a PRN generator to select two input-to-output pairs of the box, swapping their outputs, and repeating this thousands of times. The reason each permutation box takes a 5 or 6-bit input and generates a 5 or 6-bit output is that a basic logic building block of existing FPGAs is a 5 or 6-bit (depending on the FPGA vendor) lookup table. Accordingly, with the architecture shown in FIG. 5, each layer of the RHF can be efficiently implemented using exactly one logic level (i.e., gate delay). In cases where the number of address bits is not a multiple of 5 or 6, a mixture of 4 and 5-bit permutation boxes may be used.

2.3 Handling Counter Overflow and Aging

Because it is expected that memory operations will occur at a high rate, each counter of counter arrays 308(1)-(m) shown in FIG. 3 should have a reasonably large range. For example, in one set of embodiments each counter may be implemented with a range of 17 or 19 bits, which matches the width of common SRAM (static random-access memory) blocks supported by existing FPGAs.

Even with a reasonable range, it is possible for a counter to overflow, which means that the counter reaches its maximum possible value and needs to be incremented. Accordingly, this overflow scenario should be handled gracefully. Further, it is important that as each counter is incremented, it takes into account the age of memory accesses such that more recent accesses are weighed more heavily than older accesses. This is because memory tiering decisions (i.e., decisions to migrate memory units between memory tiers) are generally based on current rather than past access patterns, and thus it is desirable to track the most frequently accessed addresses over some recent time window.

Figure 6:
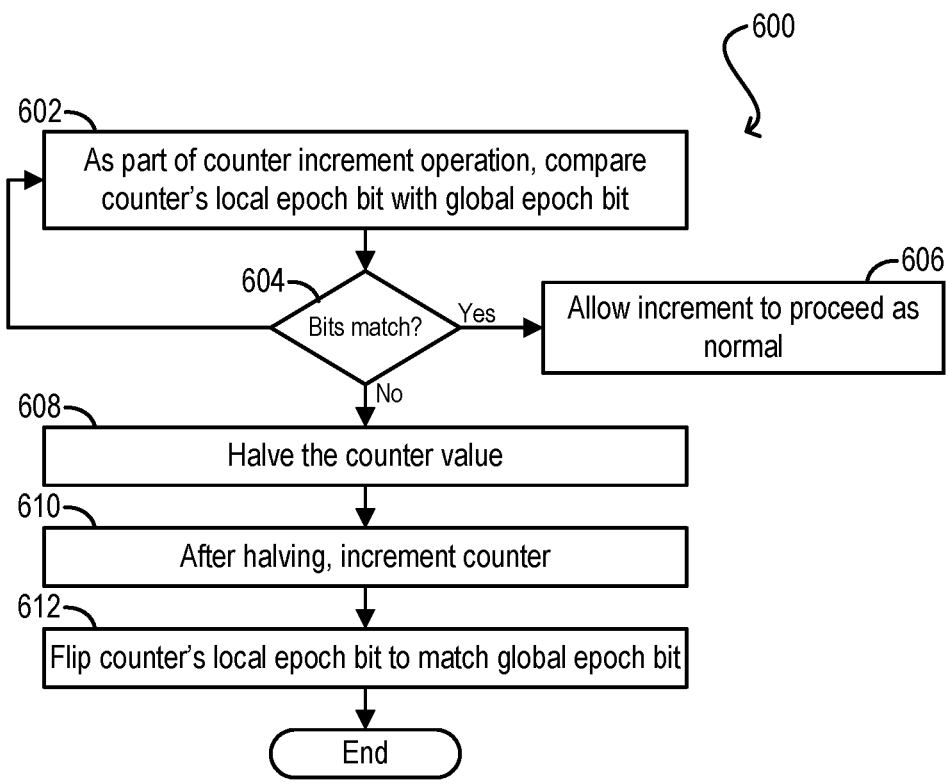
FIG. 6 depicts a workflow for handling counter overflow and aging of frequency estimates according to certain embodiments.

To address both of the foregoing issues, FIG. 6 depicts a workflow 600 that can be performed by AFT module 204 for handling counter overflows and achieving gradual aging of frequency estimates via an epoch-based mechanism. Workflow 600, which is carried out at the time of incrementing a counter of a counter array per step 408 of workflow 400, assumes that AFT module 204 is programmed/configured with an adjustable time window (referred to herein as an "epoch"), each counter of each counter array 308 has a local epoch bit, and AFT module 204 has a global epoch bit common to all counters that reflects the current epoch the module is operating in. In addition, workflow 600 assumes that the local and global epoch bits are initialized to zero upon startup of AFT module 204 and the global epoch bit is flipped under two conditions: after an epoch has elapsed or after a counter overflow has occurred.

Starting with step 602, as part of a counter increment operation by a counter array 308, AFT module 204 can compare the counter's local epoch bit with the global epoch bit. If the bits match (which means that the counter is consistent, or in sync, with the current epoch), AFT module 204 can allow the increment operation to proceed as normal (steps 604 and 606).

However, if the bits do not match at step 604 (which means that the counter is not consistent with the current epoch, either due to an epoch transition or the occurrence of a counter overflow), AFT module 204 can halve the counter value (e.g., right shift the counter value by 1 bit) before incrementing it (steps 608 and 610). AFT module 204 can then flip the counter's local epoch bit to match the global epoch bit (step 612) and the workflow can end.

By halving the counter value at step 608, two goals are achieved. First, in the case where the counter is out of sync with the current epoch due to an epoch transition, this operation achieves exponential aging or decay of counts (and thus, access frequency estimates) based on the epoch in which they occurred. For example, new counts that occur during the current epoch will receive full weight, counts that occurred during the last epoch will receive half weight (because they have been halved), counts that occurred during the epoch before the last will receive quarter weight (because they have been halved twice), and so on. As mentioned previously, this is desirable because recent memory accesses should be weighed more heavily than older memory accesses in order to facilitate accurate memory tiering decisions. In alternative embodiments other types of decay functions can be employed, such as subtracting a fixed value from the counter upon an epoch transition and using saturating arithmetic to clamp underflow to zero.

Second, in the case where the counter is out of sync with the current epoch due to a counter overflow, this operation extends the dynamic range of the counters beyond their finite precision and ensures that the fidelity of frequency estimates for the most frequently accessed addresses are preserved. As an alternative to this approach, each counter may simply saturate at its largest value. Either way, it is expected that counter overflows will be a rare event and can be mostly prevented by selecting a sufficiently short epoch. In certain embodiments, AFT module 204 may implement logic to count the number of overflow events that occur, which can then be used by a software or hardware component to dynamically adjust epoch length.

It should be noted that workflow 600 only updates a counter to be consistent with the current epoch at the time that counter is incremented (i.e., is indexed via an address received by AFT module 204). However, not all counters may be incremented during normal operations. Accordingly, in some embodiments AFT module 204 may implement a scrubbing function that updates all counters of counter arrays 308(1)-(m) to match the current epoch per the global epoch bit, each time an epoch transition occurs. For example, when there are clock cycles during which AFT module 204 does not have any input address to process, the scrubbing function can cycle through counter arrays 308(1)-(m) sequentially and halve each counter in each array if the counter's local epoch bit does not match the global epoch bit. If there are insufficient idle cycles for the scrubbing function to run prior to expiration of the current epoch, AFT module 204 can artificially create idle cycles by dropping some input addresses. With proper selection/management of epoch length, counter size, counter array size, and the input address stream rate, these drops will occur rarely and thus will not materially impact the accuracy of AFT module 204.

3. Backend Implementations

As explained with respect to FIG. 2, once frequency estimator 206 has generated frequency estimates for the addresses received by AFT module 204, these per-address frequency estimates can be further analyzed via backend 208 in order to synthesize actionable information that can be leveraged by components such as memory tiering controller 202. The following are examples of types of backends that may be implemented:

Threshold detector—This type of backend can receive a frequency estimate for an address and determine whether the estimate exceeds a programmable threshold. If so, it can generate an alert for, e.g., memory tiering controller 202 indicating that the threshold has been breached for this address. In response, memory tiering controller 202 can take an appropriate action, such as migrating the memory unit identified by the address up memory hierarchy 104. In certain embodiments, the alert can be delivered via an interrupt mechanism that ensures timely delivery of the alert and thus facilitates a fast response by memory tiering controller 202.

Statistics collector—This type of backend may be implemented in conjunction with the threshold detector and can collect, in an online manner, statistics pertaining to the frequency estimates generated by frequency estimator 206. These statistics can include, e.g., the minimal, mean, and maximal frequency estimates seen over some period of time. Some other component can then use the collected statistics to dynamically adjust the threshold employed by the threshold detector so that it is appropriate in view of current memory access patterns.

Top-n most frequent element tracker—This type of backend can keep track the n most frequently accessed addresses/memory units seen by AFT module 204 (sometimes referred to herein as the "top-n set"). A number of example implementations for this backend type are detailed in the following subsections.

Beyond the three backend types noted above, other more complex backends that incorporate auxiliary information (e.g., wall clock time, process identifier, system state, type of memory operation, the presence of pending I/O operations, etc.) are possible. These alternative backends can used for various purposes that include not only memory tiering, but also performance monitoring, anomaly detection, malware detection (e.g., Rowhammer attacks, memory side-channel exploits, etc.), and so on.

3.1 Sorting Array

Figure 7:
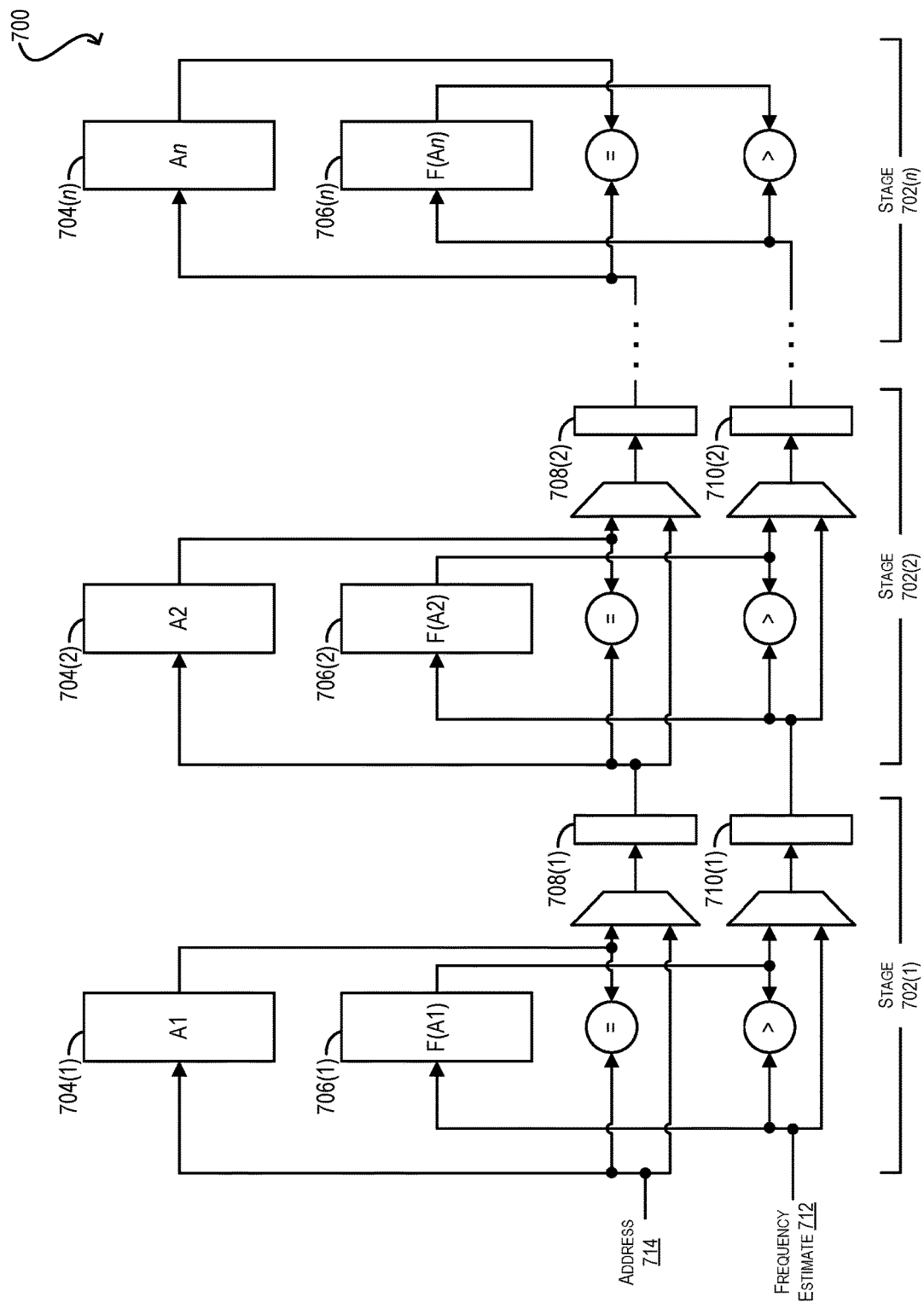
FIG. 7 depicts an example hardware architecture for a sorting array based backend according to certain embodiments.

FIG. 7 depicts a hardware architecture for backend 208 of AFT module 204 that implements a sorting array 700 to track the top n most frequently accessed addresses/memory units according to certain embodiments. As shown in FIG. 7, sorting array 700 consists of n stages 702(1)-(n), each storing one of the top n addresses (e.g., A(1), A(2), etc.) in a first register 704 and the frequency estimate for that address (e.g., F(A1), F(A2), etc.) in a second register 706. The stages are ordered such that first stage 702(1) records the most frequently accessed address and last stage 702(n) records the least frequently accessed address (from among the top n addresses). Between the stages are pipeline registers 708 and 710 to hold address/frequency estimate pairs that are passed from one stage to the next.

In operation, sorting array 700 can receive from frequency estimator 206 a frequency estimate 712 and a corresponding address 714 as input to first stage 702(1) and can compare frequency estimate 712 with frequency estimate F(A1) of address A1 stored in this first stage (which is currently the most frequently accessed address in the array). In addition, sorting array 700 can compare address 714 with address A1.

If the two addresses match and frequency estimate 712 is less than or equal to F(A1), no action can be taken. If the two addresses match and frequency estimate 712 is greater than F(A1), F(A1) can be swapped with estimate 712 in register 704(1). If the two addresses do not match and frequency estimate 712 is less than or equal to F(A1), both estimate 712 and address 714 can be passed to the next stage for evaluation against stored frequency estimate and address in that stage. And if the two address do not match and frequency estimate 712 is greater than F(A1), F(A1) can be swapped with estimate 712 in register 704(1), A1 can be swapped with address 714 in register 706(1), and F(A1) and A2 can be passed to the next stage for evaluation against stored frequency estimate and address in that stage. The end result of this process is that frequency estimate 712 and address 714 will be placed in the top-n set embodied by sorting array 700 if appropriate, at the correct location within the array.

Sorting array 700 is relatively easy to implement, but its design requires two comparators (for comparing frequency estimates and addresses), two registers, and assorted multiplexers and control logic per stage. Accordingly, the logic cost of sorting array 700 is directly proportional to the size of n, which makes it best suited for relatively small values of n (e.g., O(10)) due to the amount of logic needed.

Further, although not shown in the figure, in certain embodiments additional logic will be needed to read out registers 704 and 706 at each stage in order to obtain the top-n set, as well as to scale each frequency estimate down by a factor of 2 upon an epoch transition.

3.2 Software Reconstruction

Figure 8:
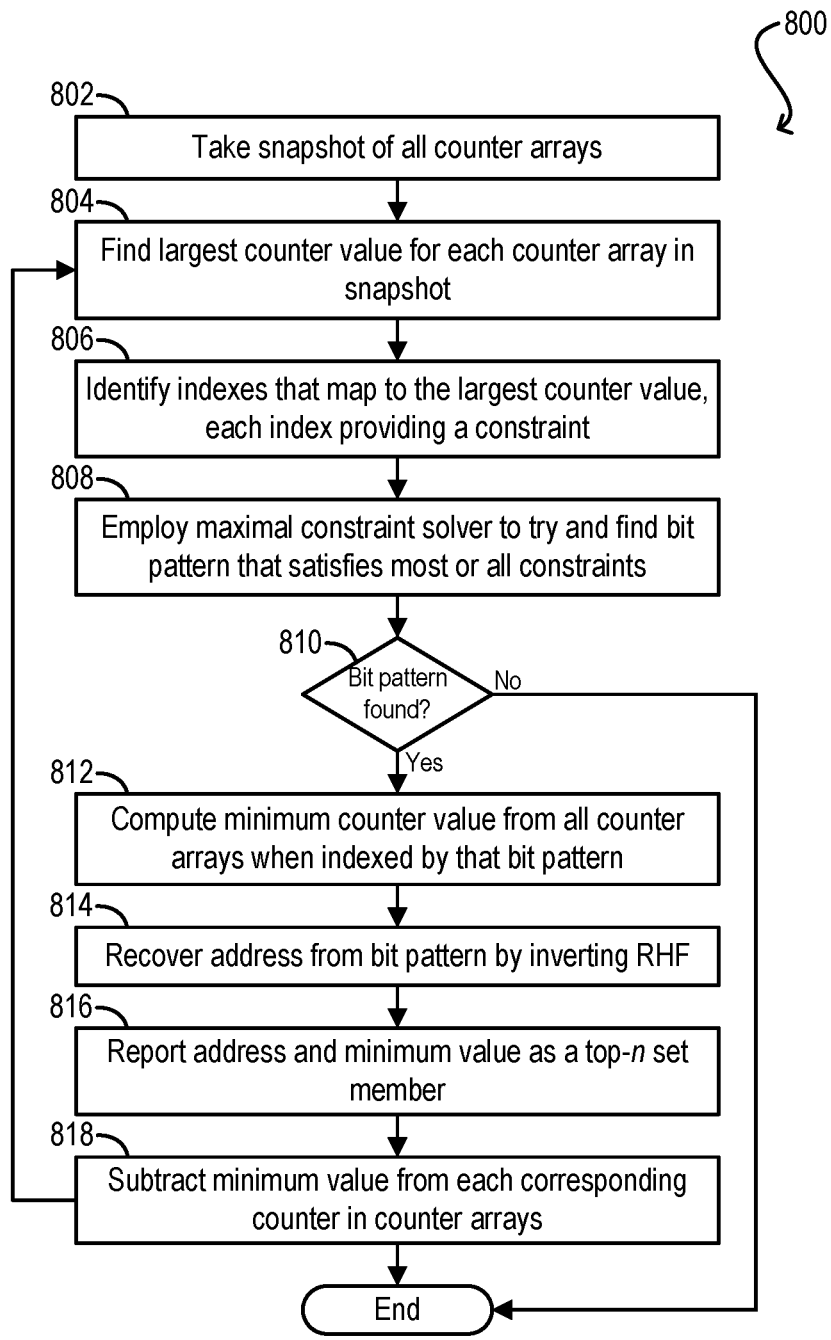
FIG. 8 depicts a workflow that may be executed by a backend for implementing software reconstruction according to certain embodiments.

FIG. 8 depicts a workflow 800 of a software algorithm (referred to as software reconstruction) that may be implemented by backend 208 of AFT module 204 to track the top n most frequently accessed addresses/memory units according to certain embodiments. At a high level, this algorithm reads out the counters in every counter array 308 and reconstructs the top-n set in software using that information, without additional hardware. Due to its design, this algorithm works best in scenarios where each bit of h(address) generated by RHF 302 is covered by a small number of counter arrays. In this context, "covered by" means that each bit of the hash value is used in the index to at least one counter array, but preferably to a small number of them.

Starting with steps 802 and 804, backend 208 can take a snapshot of all counter arrays 308(1)-(m) and can find the largest counter value for each counter array from the snapshot. This largest counter value corresponds to the most frequently received/seen index for that counter array.

At step 806, backend 208 can identify the indexes that map to the largest counter values found at step 804. Each of these indexes provides a mathematical constraint on the bit pattern of the RHF-generated hash value used to create the indexes. Backend 208 can then employ a maximal constraint solver to try and find a bit pattern that satisfies most or all of the constraints (step 808).

If such a bit pattern can be found, backend 208 can compute the minimum counter value from all counter arrays 308(1)-(m) when indexed by that bit pattern (steps 810 and 812). This minimum value is the frequency estimate for the address mapped to the bit pattern (which is the hash output of RHF 302). Backend 208 can then recover the address from the bit pattern by inverting RHF 302 (step 814), report the address and minimum value (i.e., frequency estimate for that address) as a top-n set member (step 816), subtract the minimum value from each corresponding counter in counter arrays 308(1)-(m) (step 818), and return to step 804 to find the next largest counter value.

On the other hand, if a bit pattern cannot be found by the constraint solver at block 810, backend 208 can conclude there is no address with a frequency estimate that dominates so the workflow can end. Generally speaking, the quality of the output of this software reconstruction process will depend on the average frequency differences between hot and cold memory units; a small set of very frequently accessed memory units can be reliably detected whereas more even frequency distributions may yield no results.

3.3 Min-Heap

As known in the art, a heap data structure is a complete binary tree of l levels that is represented by a linear array of $2^{l-1}$ elements. Each element of the array corresponds to a node of the binary tree and the parent-child relationships within the tree are implicitly defined by the elements' positions (i.e., indexes) in the array.

Figure 9:
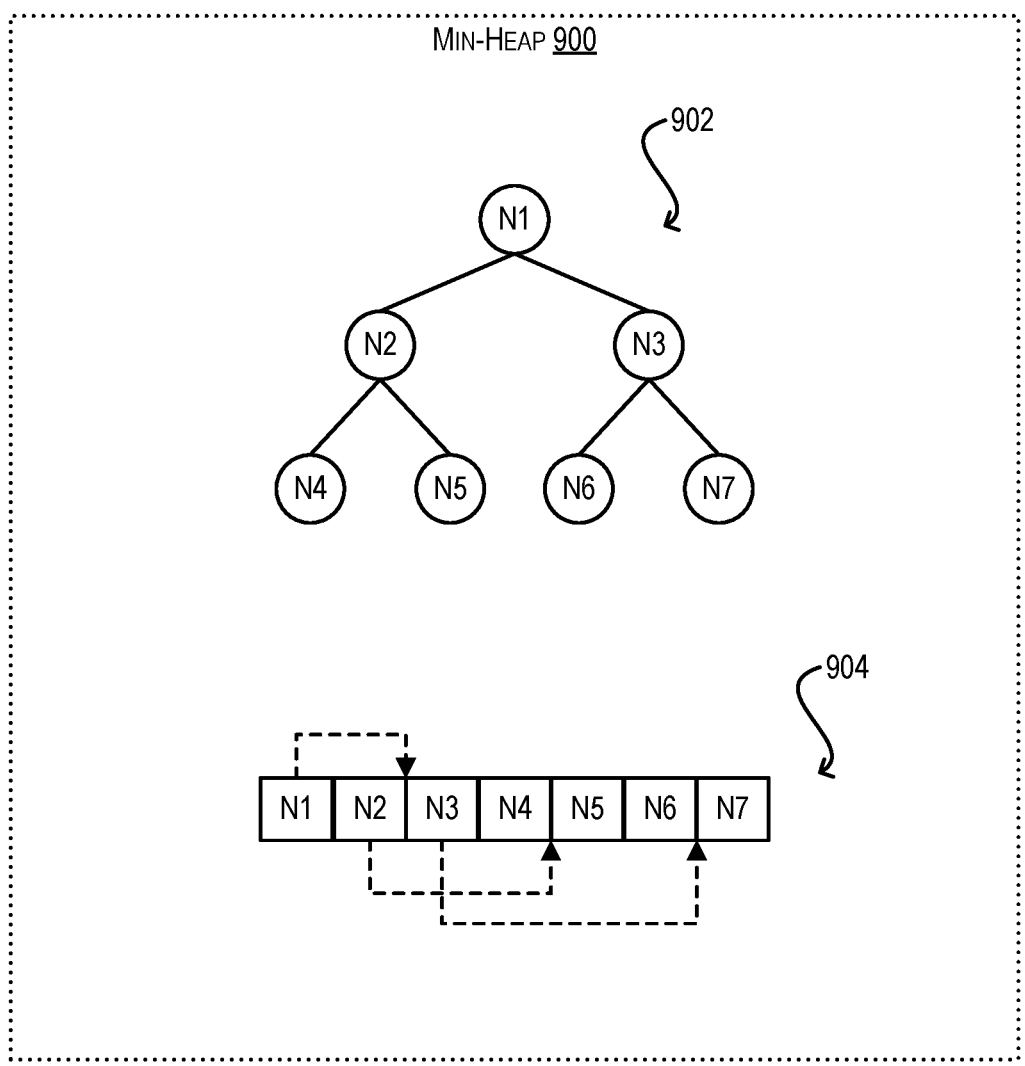
FIG. 9 depicts an example heap data structure.

For example, FIG. 9 depicts a binary tree (reference numeral 902) and a linear array (reference numeral 904) that make up an example heap 900. As can be seen, the first element of array 904 includes the root node of binary tree 902 (i.e., N1). The next two elements of array 904 include the root node's left and right children N2 and N3. The next four elements of array 904 include the four children of N2 and N3 (i.e., N4, N5, N6, and N7). This same pattern can continue for additional levels of binary tree 902.

A min-heap is a type of heap that requires the value held in a parent node to be less than or equal to each of the values held in the parent node's two children, and this heap property must be upheld for all nodes in the heap. Thus, in a min-heap the value of the root node will always contain the minimal value held by the heap. In various embodiments, these qualities can be leveraged to implement in hardware a min-heap based version of backend 208 that can track the top n most frequently accessed addresses/memory units in an efficient manner.

The general concept behind this approach is that each node of a min-heap maintained by the backend corresponds to a top-n address and the value held in the node is the address's frequency estimate. For an input address A received by AFT module 204, the frequency estimate generated by frequency estimator 206 for A is compared to the existing frequency estimate held in the min-heap's root node (which is the smallest frequency estimate in the top-n set). If it is larger, it replaces the frequency estimate held in the root node and the root node is made to correspond to address A. In addition, that newly added frequency estimate is "sifted down" the min-heap if needed in order to ensure that the min-heap property remains intact at every tree level. By always replacing the minimum frequency element in this manner, the min-heap will necessarily accumulate the most frequently accessed elements.

Replacing the root node of the min-heap may cost up to l cycles (which is equal the min-heap's depth) due to the possible need to perform sift-down operations as mentioned above. Thus, in some scenarios the min-heap backend may not be able to keep up with a very high rate of incoming addresses. However, on average, the vast majority of memory operations will not access addresses with new top access frequencies, and hence the rate of heap replacements will generally be much lower than the rate of input addresses. Further, even if input addresses need to be occasionally dropped, this approach is self-correcting because if a dropped address is also a top-n most frequently accessed address, it will very likely be accessed again in the near future. At that point it can be inserted into the min-heap. Given that such drops are expected to be infrequent, the likelihood that a given top-n address is dropped multiple times in succession becomes exponentially improbable.

Figure 10:
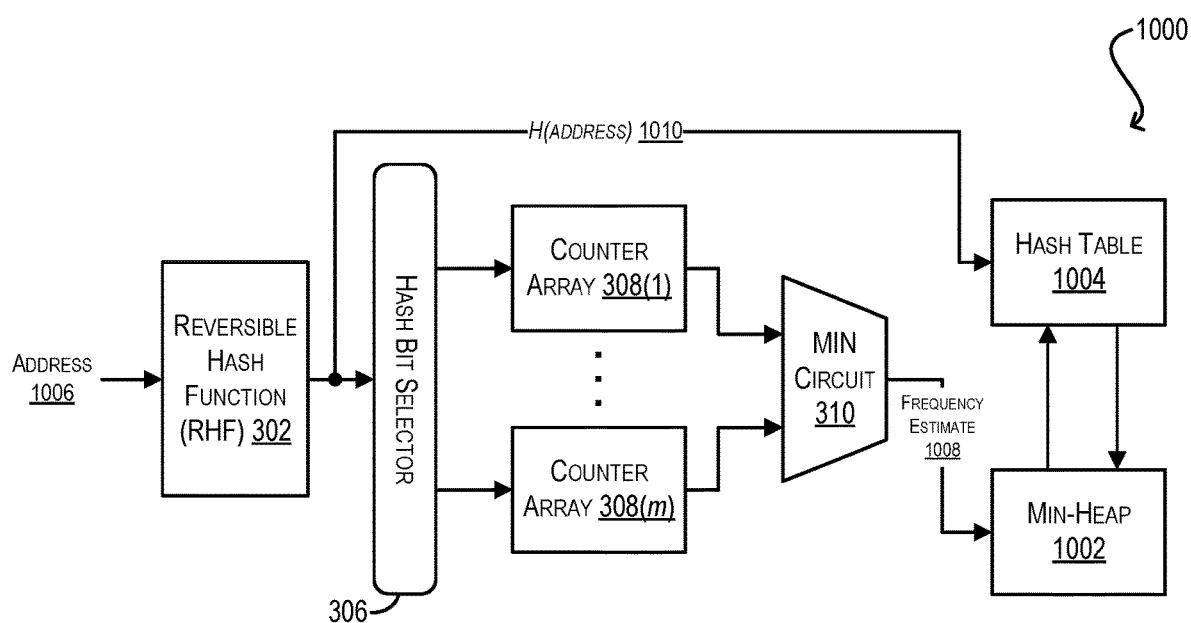
FIG. 10 depicts an example hardware architecture for a min-heap based backend according to certain embodiments.

FIG. 10 depicts an example hardware architecture 1000 for AFT module 204 that incorporates frequency estimator architecture 300 of FIG. 3 and includes a min-heap based version of backend 208 comprising a min-heap 1002 and a hash table 1004 according to certain embodiments. At the start, the values (i.e., frequency estimates) in min-heap 1002 are initialized to all zeros, where a zero value indicates that the node has not yet been assigned a valid frequency estimate (and thus is not mapped to any address). This is possible because the min-heap property noted above allows for equal valued parent and child nodes; accordingly, setting all values in the min-heap to zero does not violate that property. Further, because the frequency estimates output by frequency estimator 206 will always be at least 1 due to the way in which these estimates are incremented and output from counter arrays 308(1)-(m), a frequency estimate of zero can be used to signify an invalid estimate.

When an address 1006 is received by AFT module 204 and a frequency estimate 1008 for the address is generated by frequency estimator 206, that estimate can be passed as input to min-heap 1002 and the hash of the address (h(address) 1010) can be passed as input to hash table 1004. Control logic associated with backend 208 can then execute an algorithm (shown in FIG. 11 and described below) for placing h(address) 1010 in hash table 1004 and frequency estimate 1008 in min-heap 1002 as appropriate to ensure that these components accumulate the top-n set.

The outcome of this processing is that each node of min-heap 1002 with a value greater than zero (which holds a valid frequency estimate for a top-n set member) will map to an entry in hash table 1004 where the h(address) of that top-n member is stored. Conversely, each valid entry in hash table 1004 will be keyed by the h(address) of a top-n set member and will include a pointer to a node in min-heap 1002 with the frequency estimate for that member. This results in a storage efficient data structure that performs well in hardware. For example, if single-ported memories are used, each sift operation will take two read operations and two write operations to min-heap 1002 plus two write operations to hash table 1004, for a total of only four operations. These hash table writes can be performed concurrently with the heap writes.

In some embodiments, to further optimize performance, a small first-in-first-out (FIFO) buffer may be placed before the min-heap backend. This FIFO buffer can act as a temporal buffer to smooth out bursts in the input address stream and thus can reduce the number of h(address), frequency estimate pairs that need to be dropped when the min-heap is busy with sift operations.

Additionally, in some embodiments hash table 1004 may be implemented using a 2-choice hash table, which is relatively easy to build in hardware and advantageously minimizes hash collisions. A hash collision in this context is a scenario where a new h(address) to be inserted into hash table 1004 maps to the same entry as an existing h(address) already in the table. With 2-choice hashing, the probability of this occurring will be relatively rare. In the case where it does occur, that new h(address) and its corresponding frequency estimate can simply be dropped by the backend. This will prevent the address mapped to h(address) as being identified as a top-n set member, but given the rarity of this scenario it should not have any consequential effects.

Figure 11:
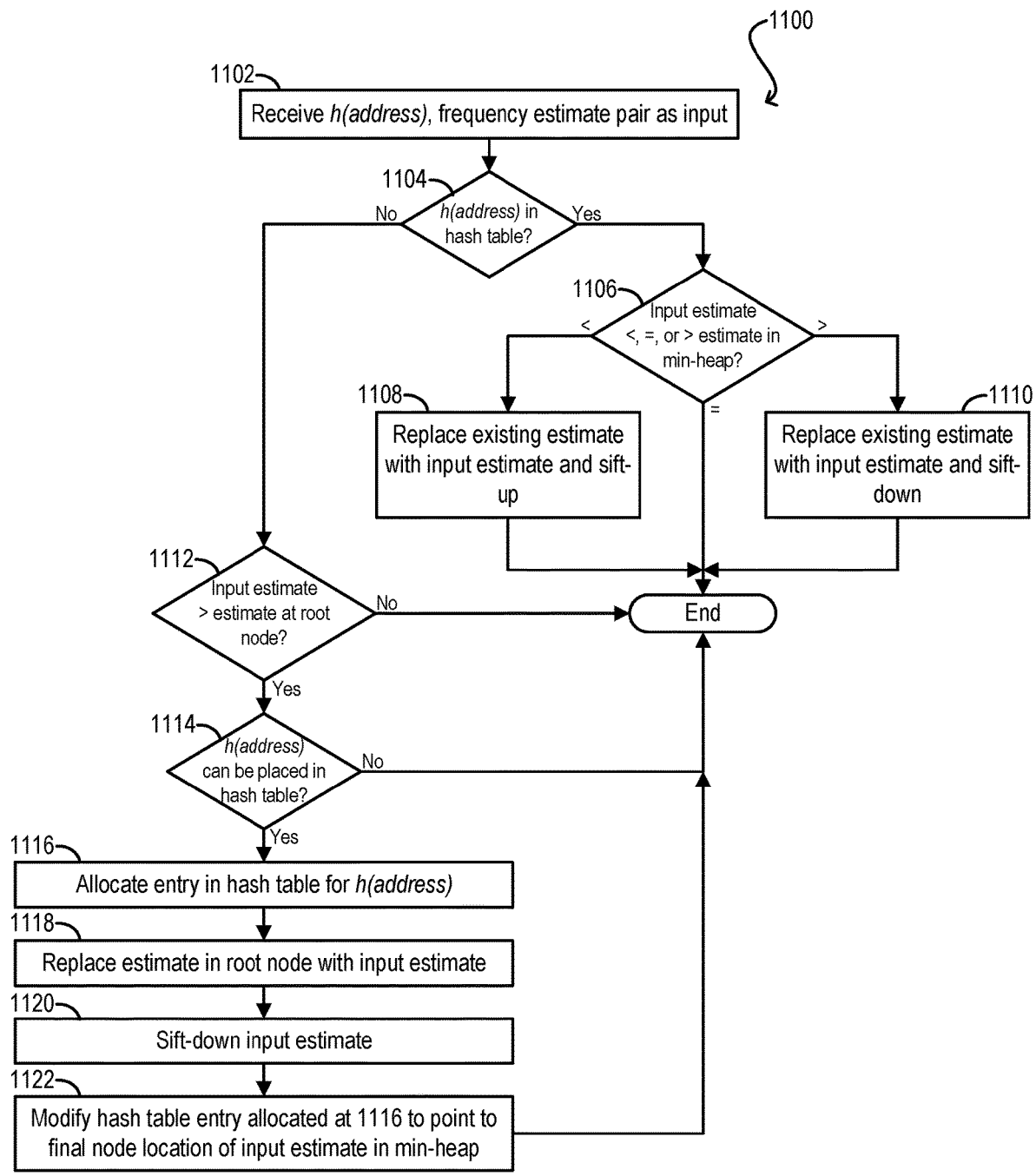
FIG. 11 depicts a workflow that may be executed by the min-heap based backend of FIG. 10 according to certain embodiments.

FIG. 11 depicts a workflow 1100 that may be performed by the min-heap backend of FIG. 10 for processing an incoming h(address), frequency estimate pair and adding that pair to the top-n set if appropriate according to certain embodiments. It should be noted that in alternative embodiments the min-heap backend may instead operate on address, frequency estimate pairs because an address and its hash value are interchangeable per the reversibility property of RHF 302.

Starting with steps 1102 and 1104, the min-heap backend can receive as input the h(address), frequency estimate pair and check whether h(address) exists in hash table 1004. If the answer is yes, the min-heap backend can further check whether the input frequency estimate is less than, equal to, or greater than the existing frequency estimate for h(address) held in min-heap 1002 (step 1106).

If the input frequency estimate is less than the existing frequency estimate, the min-heap backend can replace the existing estimate with the input estimate and can sift-up that value through the min-heap until the min-heap property is no longer violated (step 1108). If the input frequency estimate is equal to the existing frequency estimate, no action can be taken. And if the input frequency estimate is greater than the existing frequency estimate, the min-heap backend can replace the existing estimate with the input estimate and can sift-down that value through the min-heap until the min-heap property is no longer violated (step 1110).

Returning now to step 1104, if h(address) does not exist in hash table 1004, the min-heap backend can check whether the input frequency estimate is greater than the frequency estimate at the root node of the min-heap (step 1112). If the answer is no, no action can be taken.

If the answer is yes, the min-heap backend can further check whether h(address) can be placed in hash table 1004 (i.e., there is no hash collision) (step 1114). If the answer is no, no action can be taken.

However, if the answer at step 1114 is yes (i.e., there is no hash collision), the min-heap backend can allocate an entry in hash table 1004 for h(address) (step 1116), replace the existing frequency estimate in the root node with the input frequency estimate (step 1118), and sift-down that value until the min-heap property is no longer violated (step 1120). Finally, at step 1122, the min-heap backend can modify the hash table entry allocated at step 1116 to point to the final node location of the input frequency estimate within the min-heap.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any storage device, based on any existing or subsequently developed technology, that can store data and/or computer programs in a non-transitory state for access by a computer system. Examples of non-transitory computer readable media include a hard drive, network attached storage (NAS), read-only memory, random-access memory, flash-based nonvolatile memory (e.g., a flash memory card or a solid state disk), persistent memory, NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method comprising:
   receiving, by a hardware module of a computer system, a stream of addresses corresponding to memory units being accessed by a central processing unit (CPU) of the computer system;
   generating, by the hardware module, a frequency estimate for each address in the stream of addresses, wherein the frequency estimate is indicative of a number of times a memory unit identified by the address has been accessed by the CPU, and wherein generating the frequency estimate comprises computing a hash value from the address; and
   determining, by the hardware module based on the generated frequency estimates, a set of n most frequently accessed memory units, wherein n is greater than zero.

2. The method of claim 1 wherein the computer system includes a first memory tier corresponding to a first type of physical memory and a second memory tier corresponding to a second type of physical memory, wherein the second type of physical memory is slower but less expensive than the first type of physical memory, and wherein the hardware module is part of or communicatively coupled with a memory controller of the second type of physical memory.

3. The method of claim 2 wherein the set of n most frequently accessed memory units is provided to a memory tiering controller, and wherein the memory tiering controller migrates at least a portion of the set of n most frequently accessed memory units from the second type of physical memory to the first type of physical memory.

4. The method of claim 1 wherein the hash value has k bits, and wherein generating the frequency estimate for the address further comprises:
   for each of a plurality of counter arrays:
      assigning a subset of the k bits as an index to the counter array; and
      incrementing, at the counter array, a counter mapped to the index.

5. The method of claim 4 wherein the generating further comprises:
   computing a minimum value of the incremented counters; and
   outputting the minimum value as the frequency estimate.

6. The method of claim 1 wherein determining the set of n most frequently accessed memory units comprises, for each address in the stream of addresses:
   determining that the hash value computed from the address is present in a hash table of the hardware module;
   checking whether the frequency estimate generated for the address is less than, equal to, or greater than an existing frequency estimate for the address maintained in a min-heap of the hardware module;
   upon determining that the frequency estimate is less than the existing frequency estimate, replacing the existing frequency estimate with the frequency estimate and performing a sift-up operation with respect to the frequency estimate in the min-heap; and
   upon determining that the frequency estimate is greater than the existing frequency estimate, replacing the existing frequency estimate with the frequency estimate and performing a sift-down operation with respect to the frequency estimate in the min-heap.

7. The method of claim 1 wherein determining the set of n most frequently accessed memory units comprises, for each address in the stream of addresses:
   determining that the hash value computed from the address is not present in a hash table of the hardware module;
   determining that the frequency estimate generated for the address is greater than an existing frequency estimate in a root node of a min-heap of the hardware module;
   allocating a new entry in the hash table for the hash of the address;
   replacing the existing frequency estimate at the root node with the frequency estimate;

performing a sift-down operation with respect to the frequency estimate in the min-heap; and modifying the new entry to point to a final node location of the frequency estimate in the min-heap.

8. A hardware module of a computer system configured to:

receive a stream of addresses corresponding to memory units being accessed by a central processing unit (CPU) of the computer system;

generate a frequency estimate for each address in the stream of addresses, wherein the frequency estimate is indicative of a number of times a memory unit identified by the address has been accessed by the CPU, and wherein generating the frequency estimate comprises computing a hash value from the address; and determine, based on the generated frequency estimates, a set of n most frequently accessed memory units, wherein n is greater than zero.

9. The hardware module of claim 8 wherein the computer system includes a first memory tier corresponding to a first type of physical memory and a second memory tier corresponding to a second type of physical memory, wherein the second type of physical memory is slower but less expensive than the first type of physical memory, and wherein the hardware module is part of or communicatively coupled with a memory controller of the second type of physical memory.

10. The hardware module of claim 9 wherein the set of n most frequently accessed memory units is provided to a memory tiering controller, and wherein the memory tiering controller migrates at least a portion of the set of n most frequently accessed memory units from the second type of physical memory to the first type of physical memory.

11. The hardware module of claim 8 wherein the hash value has k bits, and wherein generating the frequency estimate for the address further comprises:

for each of a plurality of counter arrays:
assigning a subset of the k bits as an index to the counter array; and
incrementing, at the counter array, a counter mapped to the index.

12. The hardware module of claim 11 wherein the generating further comprises:

computing a minimum value of the incremented counters; and outputting the minimum value as the frequency estimate.

13. The hardware module of claim 8 wherein determining the set of n most frequently accessed memory units comprises, for each address in the stream of addresses:

determining that the hash value computed from the address is present in a hash table of the hardware module;

checking whether the frequency estimate generated for the address is less than, equal to, or greater than an existing frequency estimate for the address maintained in a min-heap of the hardware module;

upon determining that the frequency estimate is less than the existing frequency estimate, replacing the existing frequency estimate with the frequency estimate and performing a sift-up operation with respect to the frequency estimate in the min-heap; and upon determining that the frequency estimate is greater than the existing frequency estimate, replacing the existing frequency estimate with the frequency estimate and performing a sift-down operation with respect to the frequency estimate in the min-heap.

14. The hardware module of claim 8 wherein determining the set of n most frequently accessed memory units comprises, for each address in the stream of addresses:

determining that the hash value computed from the address is not present in a hash table of the hardware module;

determining that the frequency estimate generated for the address is greater than an existing frequency estimate in a root node of a min-heap of the hardware module;

allocating a new entry in the hash table for the hash of the address;

replacing the existing frequency estimate at the root node with the frequency estimate;

performing a sift-down operation with respect to the frequency estimate in the min-heap; and modifying the new entry to point to a final node location of the frequency estimate in the min-heap.

15. A computer system comprising:

a processor; and a hardware module configured to:
receive a stream of addresses corresponding to memory units being accessed by a central processing unit (CPU) of the computer system;

generate a frequency estimate for each address in the stream of addresses, wherein the frequency estimate is indicative of a number of times a memory unit identified by the address has been accessed by the CPU, and wherein generating the frequency estimate comprises computing a hash value from the address; and determine, based on the generated frequency estimates, a set of n most frequently accessed memory units.

16. The computer system of claim 15 wherein the computer system includes a first memory tier corresponding to a first type of physical memory and a second memory tier corresponding to a second type of physical memory, wherein the second type of physical memory is slower but less expensive than the first type of physical memory, and wherein the hardware module is part of or communicatively coupled with a memory controller of the second type of physical memory.

17. The computer system of claim 16 wherein the set of n most frequently accessed memory units is provided to a memory tiering controller, and wherein the memory tiering controller migrates at least a portion of the set of n most frequently accessed memory units from the second type of physical memory to the first type of physical memory.

18. The computer system of claim 15 wherein generating the frequency estimate for the address comprises:

computing a hash value from the address, the hash value having k bits; and for each of a plurality of counter arrays:
assigning a subset of the k bits as an index to the counter array; and
incrementing, at the counter array, a counter mapped to the index.

19. The computer system of claim 18 wherein the generating further comprises:

computing a minimum value of the incremented counters; and outputting the minimum value as the frequency estimate.

20. The computer system of claim 15 wherein determining the set of n most frequently accessed memory units comprises:

determining that a hash of the address is present in a hash table of the hardware module;

checking whether the frequency estimate is less than, equal to, or greater than an existing frequency estimate for the address maintained in a min-heap of the hardware module;

upon determining that the frequency estimate is less than the existing frequency estimate, replacing the existing frequency estimate with the frequency estimate and performing a sift-up operation with respect to the frequency estimate in the min-heap; and upon determining that the frequency estimate is greater than the existing frequency estimate, replacing the existing frequency estimate with the frequency estimate and performing a sift-down operation with respect to the frequency estimate in the min-heap.

21. The computer system of claim 15 wherein determining the set of n most frequently accessed memory units comprises:

determining that a hash of the address is not present in a hash table of the hardware module;

determining that the frequency estimate is greater than an existing frequency estimate in a root node of a min-heap of the hardware module;

allocating a new entry in the hash table for the hash of the address;

replacing the existing frequency estimate at the root node with the frequency estimate;

performing a sift-down operation with respect to the frequency estimate in the min-heap; and modifying the new entry to point to a final node location of the frequency estimate in the min-heap.

* * * * *